(12) United States Patent
Kim

(10) Patent No.: US 11,647,690 B2
(45) Date of Patent: May 16, 2023

(54) LAWN MOWER ROBOT AND METHOD OF CONTROLLING THE SAME

(71) Applicant: LG ELECTRONICS INC., Seoul (KR)

(72) Inventor: Jongha Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 289 days.

(21) Appl. No.: 17/010,283

(22) Filed: Sep. 2, 2020

(65) Prior Publication Data

US 2021/0059112 A1 Mar. 4, 2021

(30) Foreign Application Priority Data

Sep. 3, 2019 (KR) .................. 10-2019-0108704

(51) Int. Cl.
*A01D 34/00* (2006.01)
*A01D 101/00* (2006.01)

(52) U.S. Cl.
CPC ......... *A01D 34/003* (2013.01); *A01D 34/008* (2013.01); *A01D 2101/00* (2013.01)

(58) Field of Classification Search
CPC . A01D 34/003; A01D 34/008; A01D 2101/00
USPC ......................................................... 56/12.1
See application file for complete search history.

(56) References Cited

U.S. PATENT DOCUMENTS

| 2,939,636 A | 6/1960 | Mullin |
| 3,040,990 A | 6/1962 | Gotti |
| 4,926,622 A | 5/1990 | McKee |
| 5,189,869 A * | 3/1993 | McBride ............ A01D 34/003 56/320.1 |
| 6,260,340 B1 | 7/2001 | Sanner |
| 6,364,960 B1 | 4/2002 | Bayley |
| 6,910,320 B1 | 6/2005 | Thorman et al. |
| 2015/0366128 A1 | 12/2015 | Durchman |
| 2016/0338262 A1 * | 11/2016 | Liu ..................... G08B 13/194 |

FOREIGN PATENT DOCUMENTS

| CN | 201227633 Y | * 4/2009 |
| CN | 205341359 U | * 6/2016 |
| CN | 207505437 U | * 6/2018 |
| CN | 108848885 A | * 11/2018 |
| CN | 108848885 A | 11/2018 |
| CN | 209105661 U | * 7/2019 |
| FR | 2677903 A1 | 12/1992 |
| JP | H08-294316 A | 11/1996 |
| JP | 2003-181390 A | 7/2003 |

(Continued)

OTHER PUBLICATIONS

Korean Office Action dated Apr. 29, 2021, for Korean Patent Appln. No. 10-2019-0108704 (7 pages).

(Continued)

*Primary Examiner* — Mahmoud Gimie

(74) *Attorney, Agent, or Firm* — Birch, Stewart, Kolasch & Birch, LLP

(57) ABSTRACT

A lawn mower robot includes a water tank configured to store water, a nozzle, and a cleaning module that is configured to clean the cutting blades of the robot by spraying water stored in the water tank on the blades through the nozzle.

18 Claims, 7 Drawing Sheets

(56) References Cited

FOREIGN PATENT DOCUMENTS

| JP | 2003181390 A | * | 7/2003 |
| JP | 2019-511265 A | | 4/2019 |

OTHER PUBLICATIONS

Australian Office Action dated Jun. 10, 2021, for Australian Patent Appln. No. 2020227078 (8 pages).
Korean Office Action in Korean Patent Application No. 10-2019-0108704, dated Oct. 18, 2021 (5 pages).

* cited by examiner

LAWN MOWER ROBOT AND METHOD OF CONTROLLING THE SAME

BACKGROUND

1. Field

The present disclosure relates generally to a lawn mower robot and a method of controlling the same, and more particularly to a lawn mower robot including a cleaning module for cleaning blades, and a method of controlling the same.

2. Description of the Related Art

Mobile robots are devices for performing predetermined operations without any manipulation by a user. The mobile robots perform operations, including cleaning while traveling in an area, avoiding an obstacle upon detecting the obstacle, and the like. An example of such mobile robots includes a lawn mower robot for mowing the lawn in a specific area.

The lawn mower robot is a device for mowing the lawn in a predetermined area, and examples thereof include a riding lawn mower designed for mowing the grass or weeds while a user rides and moves the lawn mower, a walk-behind lawn mower designed for mowing the lawn while a user directly pushes the lawn mower from behind, and a handy lawn mower designed for mowing the lawn as a user moves the lawn mower while carrying it.

Among the lawn mower robots, the handy lawn mower, having improved portability, may be kept indoors while not in use, but other types of lawn mower robots are too heavy for users to carry, such that the lawn mowers have to be kept outdoors under normal circumstances.

However, there is a problem in that in the lawn mowers, except for the handy lawn mower, blades for cutting the grass are generally disposed on the lower side of a body, such that in order to clean the blades, it is required to tilt the lawn mower robots to one side or to disassemble them.

Korean Patent Laid-Open Publication No. 10-2012-0043640 discloses a walk-behind lawn mower.

Referring to FIG. 1, the walk-behind lawn mower disclosed in the related art has a front wall portion serving as a handle, such that there is no need to provide a separate handle for the lawn mower, thereby preventing rainwater from collecting between an outer wall 31a and a portion 11g other than the front wall portion.

However, the walk-behind lawn mower of the related art merely has an effect of preventing rainwater from collecting, without providing a method of using the rainwater. Furthermore, the walk-behind lawn mower of the related art has a problem in that in order to clean blades, it is required to lift or tilt the lawn mower which is quite heavy.

SUMMARY

It is an object of the present disclosure to provide a lawn mower robot, in which blades disposed on a lower side of the robot may be cleaned without requiring to lift the lawn mower robot, and a method of controlling the same.

It is another object of the present disclosure to provide a lawn mower robot, in which cleaning is performed using rainwater, and a method of controlling the same.

The objects of the present disclosure are not limited to the aforementioned objects and other objects not described herein will be clearly understood by those skilled in the art from the following description.

In accordance with an aspect of the present disclosure, the above and other objects can be accomplished by providing a lawn mower robot including: a body forming an outer shape and an inner space; a travel module configured to move the body; a work module disposed at a bottom surface of the body, and having at least one or more blades and a drive motor for driving the blades; a cleaning module disposed at the body and configured to clean the blades.

The cleaning module may include: a water tank in which external water is collected and stored; and a nozzle for spraying the water stored in the water tank on the blades.

The cleaning module may further include a water collecting part disposed at an upper side of the body and having an open upper portion to collect external water falling therethrough, or may include an opening having a shape which is wide at top and narrow at bottom.

The cleaning module may be disposed above the work module.

The cleaning module may further include a pump for pressurizing the water in the water tank and transferring the water to the nozzle.

The water tank may have an opening formed at an upper end thereof, and may have an opening filter formed at the opening and preventing inflow of foreign matter.

An injection pipe may be connected to the water tank at a position above a lower surface of the water tank, and an injection pipe filter for preventing the inflow of foreign matter may be disposed at an entrance of the injection pipe.

The nozzle may vertically overlap the blades, and may spray water in an opposite direction to a rotation axis of the blades.

A blower fan may generate an air flow toward the blades and in the opposite direction to the rotation axis of the blades.

The blower fan may be disposed closer to the rotation axis of the blades than the nozzle.

The lawn mower robot may further include a drain pipe for discharging water, stored in the water tank, outside of the water tank, the drain pipe being connected to a lower surface of the water tank and having a drain valve.

A water level sensor may be disposed in the water tank, wherein the water level sensor may be mechanically or electrically connected to the drain valve.

Other unmentioned technical solutions can be clearly understood from the following description by those having ordinary skill in the technical field to which the present disclosure pertains.

DETAILED DESCRIPTION OF THE PREFERRED EMBODIMENTS

Figure 1:
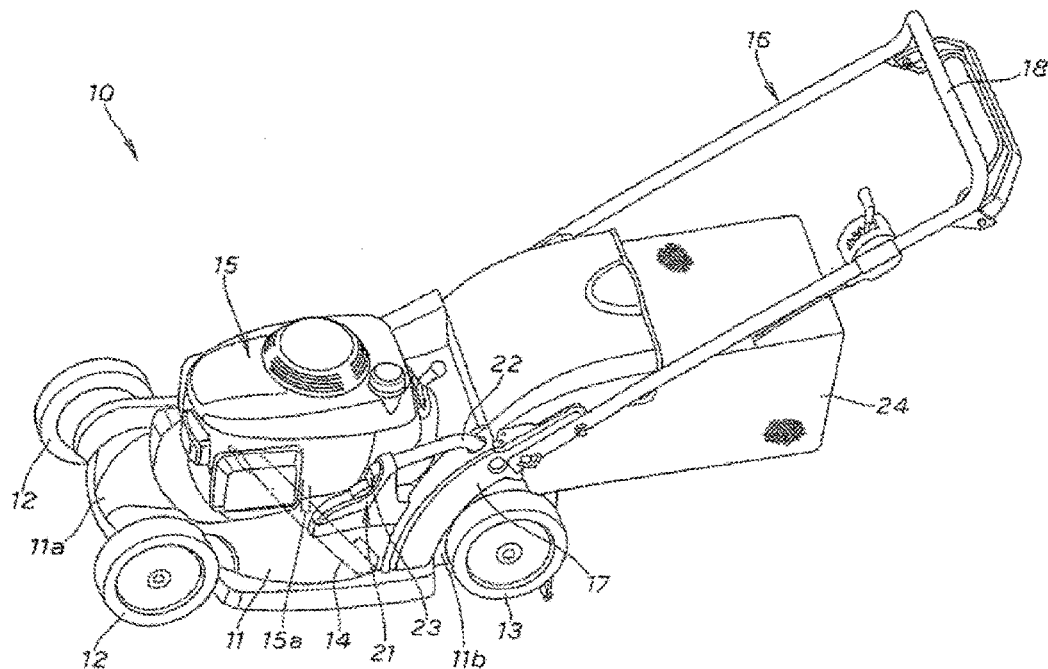
FIG. 1 is a perspective view of a general lawn mower robot.

Advantages and features of the present disclosure and methods for accomplishing the same will be more clearly understood from exemplary embodiments described below with reference to the accompanying drawings. However, the present disclosure is not limited to the following embodiments but may be implemented in various different forms. The embodiments are provided only to complete disclosure of the present disclosure and to fully provide a person having ordinary skill in the art to which the present disclosure pertains with the category of the present disclosure, and the present disclosure will be defined by the scope of the appended claims. Wherever possible, like reference numerals generally denote like elements through the specification.

Hereinafter, embodiments of a lawn mower robot and a method of controlling the same will be described with reference to the accompanying drawings.

The lawn mower robot 1 will be schematically described below mainly with reference to FIG. 2 along with FIG. 1.

Figure 2:
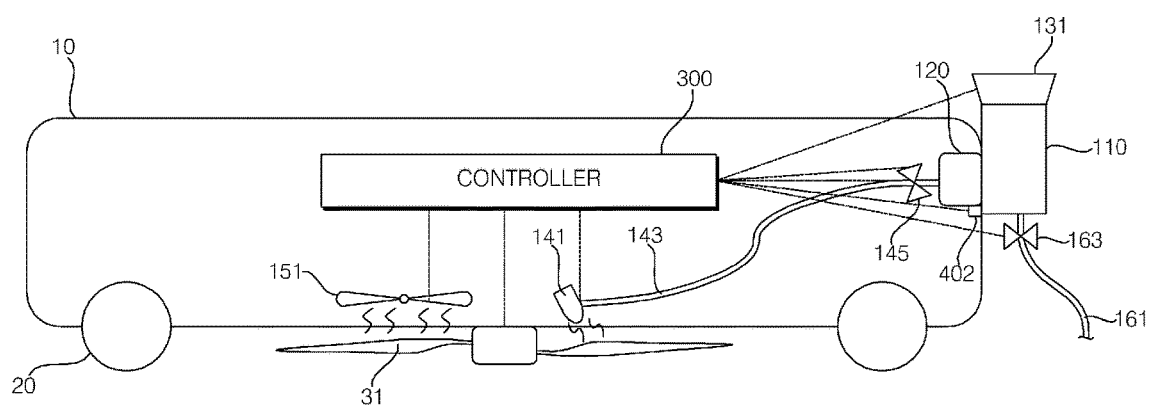
FIG. 2 is a schematic side view of a lawn mower robot according to an embodiment of the present disclosure.

As illustrated in FIG. 2, the lawn mower robot 1 includes a body 10, forming an outer shape and an inner space, and a travel module 20 configured to move and rotate the lawn mower robot 1.

The travel module 20 has at least one or more wheels and may have four wheels as illustrated in FIG. 1. In the case where the travel module 20 has four wheels, the four wheels may be disposed on the left and right front sides and on the left and right rear sides with respect to the center of the body 10. An auxiliary wheel (not shown) may be provided in the body 10.

The travel module 20 includes a drive motor. The travel module 20 may include a plurality of drive motors, each of which may be connected to the respective wheels.

A battery (not shown) for supplying power may be included in the body 10. The battery may supply power to the drive motor. The battery may supply power to a blade motor (not shown). The battery may supply power to the controller 300. The battery may be disposed on a lower side of the rear portion of the inner space of the body 10.

The lawn mower robot 1 includes a work module 30 for mowing the grass or weeds having grown to a predetermined height or more. The work module 30 may be disposed on a lower end of the front surface of the body 10 or a lower end of the central portion of the body 10.

The work module 30 may include a blade 31 which is rotatably mounted to mow the lawn. The work module 30 may include a blade motor for providing torque to the blade 31.

The blade 31 is disposed between the front wheels and the rear wheels. The blade 31 is disposed on a lower side of the body 10. The blade 31 is exposed on the lower side of the body 10. The blade 31 cuts the grass by rotating about a rotation axis A1 extending in an up-down direction. The blade 31 is rotatably mounted to the body 10.

The blade motor (not shown) is disposed at a lower side of a central portion of the inner space of the body 10. The torque of the motor shaft may be delivered to the blade 31 by using a structure such as a gear and the like.

The lawn mower robot 1 may include an input unit (not shown) for inputting a user's various instructions. The input unit may include a button, a dial, a touch-type display, and the like. The input unit may include a microphone for voice recognition.

The lawn mower robot 1 may include an output unit (not shown) for outputting a variety of information to a user. The output unit may include a display module for outputting visual information. The output unit may include a speaker for outputting auditory information.

The lawn mower robot 1 may include a storage for storing a variety of information. The storage may include volatile or non-volatile recording medium for storing a variety of information required for controlling the lawn mower robot 1. The storage may store information input from the input unit. The storage may store programs for controlling the lawn mower robot 1.

The lawn mower robot 1 includes a sensor unit 400 for sensing information related to a state of the lawn mower robot 1 or to the external environment. The sensing unit 400 may include at least one of a remote signal sensor for sensing a remote signal, an obstacle sensor for sensing an obstacle located near the robot, a rain sensor for sensing rain falling on the robot during rainfall, a case motion sensor for sensing a motion of the case, a bumper sensor, an azimuth sensor, a weight sensor, a warning signal sensor, a GPS sensor, and a cliff sensor.

The lawn mower robot 1 includes a controller 300 for controlling the operation of the lawn mower robot 1. The controller 300 may process signals of the sensing unit 400. The controller 300 may process signals of the input unit.

The controller 300 may include a main board (not shown) disposed in the inner space of the body 10. The main board may be a printed circuit board (PCB).

The controller 300 may control the lawn mower robot 1. The controller 300 may control driving of the travel module 20 based on a signal received from the input unit. The controller 300 may control driving of the travel module 20 based on a signal received from the sensing unit 400.

Referring to FIG. 2, the lawn mower robot 1 according to the present disclosure will be described below.

The lawn mower robot 1 includes the work module 30 disposed on a bottom surface of the body 10. The work module 30 is disposed on the bottom surface of the body 10, and includes one or more blades 31, provided on the bottom surface thereof, and a drive motor for driving the blades 31. The blades 31 rotates about the rotation axis A1 which may be positioned perpendicular to a floor surface. Two or more blades 31 may be formed to be symmetric to each other with respect to the rotation axis A1. The blades 31 cut the grass while rotating.

The lawn mower robot 1 includes a cleaning module 100 disposed on the bottom surface of the body 10 and configured to clean the blades 31. The cleaning module 100 includes a water tank 110 for storing water supplied from an external source, and a nozzle 141 for spraying water, stored in the water tank 110, on the blades 31.

External water may be collected and stored in the water tank 110 even if a user does not supply water directly. The external water includes rainwater. The water is stored in the water tank 110, and flows to the nozzle 141 during cleaning to be sprayed on the blades 31.

The cleaning module 100 may further include a water collecting part 131. The water collecting part 313 is a device for collecting water from an external source and delivers the collected water to the water tank 110. The water collecting part 313 may be formed integrally with or separately from the water tank 110.

The water collecting part 313 may include a cap formed on a top surface thereof. The cap of the water collecting part 313 may be controlled by the controller 300. Once the rain sensor senses rain, the rain sensor may transmit a signal to the controller 300; and upon receiving the signal, the controller 300 may open the cap to collect rainwater.

According to an embodiment of the present disclosure, referring to FIG. 2, the water collecting part 131 may be integrally formed with the water tank 110. The water collecting part 131 may be disposed on an upper side of the water tank 110, and has an open upper portion to collect external water falling therethrough. The water collecting part 131 may have a shape which is wide at top and narrow at bottom. However, the shape of the water collecting part 131 is not limited to the embodiment of FIG. 2, and may include shapes which may be easily changed by those skilled in the art.

Figure 3:
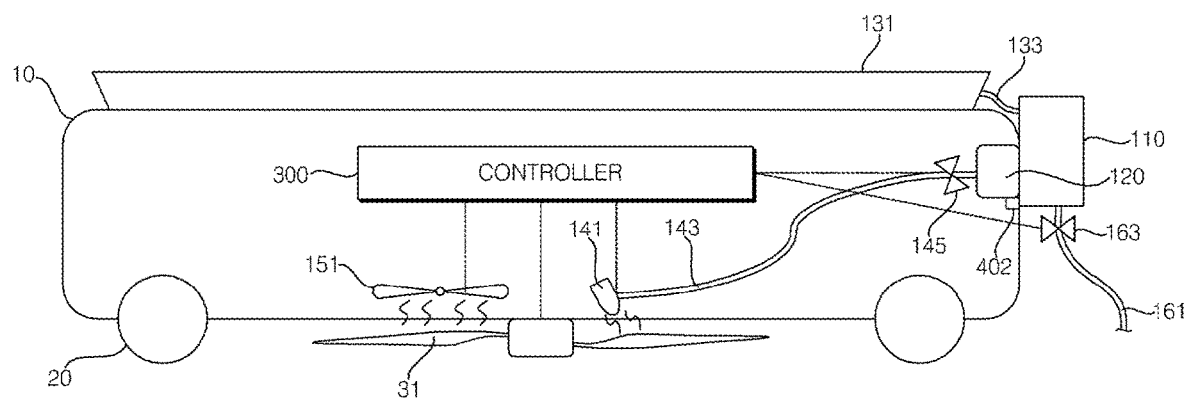
FIG. 3 is a schematic side view of a lawn mower robot according to another embodiment of the present disclosure.

According to another embodiment of the present disclosure, referring to FIG. 3, the water collecting part 131 may be formed separately from the water tank 110. The water collecting part 131 may be disposed on an upper side of the body 10, and may have an open upper portion to collect external water falling therethrough. The water collecting part 131 may further include a water collecting pipe 133 being formed on one side thereof and allowing water to flow to the water tank 110. The water collecting part 131 may have a shape which is wide at top and narrow at bottom. However, the shape of the water collecting part 131 is not limited to the embodiment of FIG. 2, and may include shapes which may be easily changed by those skilled in the art.

According to an embodiment of the present disclosure, the cleaning module 100 may be disposed above the work module 30. As the cleaning module 100 is disposed above the work module 30, water stored in the water tank 110 has high potential energy. Accordingly, when water is discharged from the cleaning module 100, the water may free fall to the work module 30. In the embodiment, a pump 120 for spraying water is not required, such that battery consumption may be reduced.

According to another embodiment of the present disclosure, the cleaning module 100 may include the pump 120. The pump 120 pressurizes water in the water tank 110 and transfers the water to the nozzle 141. When the cleaning module 100 includes the pump 120, the cleaning module 100 is not required to be disposed above the work module 30. In the embodiment, there is no limitation on the position of the water tank 110, such that the components of the lawn mower robot 1 may be freely arranged.

In addition, the cleaning module 100 may further include the pump 120 and may be disposed above the work module 30. In this embodiment, water in the water tank 110 has high potential energy; and when the pump 120 sprays the water, the water is further pressurized by the pump 120, such that the water may be sprayed with high water pressure, thereby increasing cleaning power.

Figure 4A:
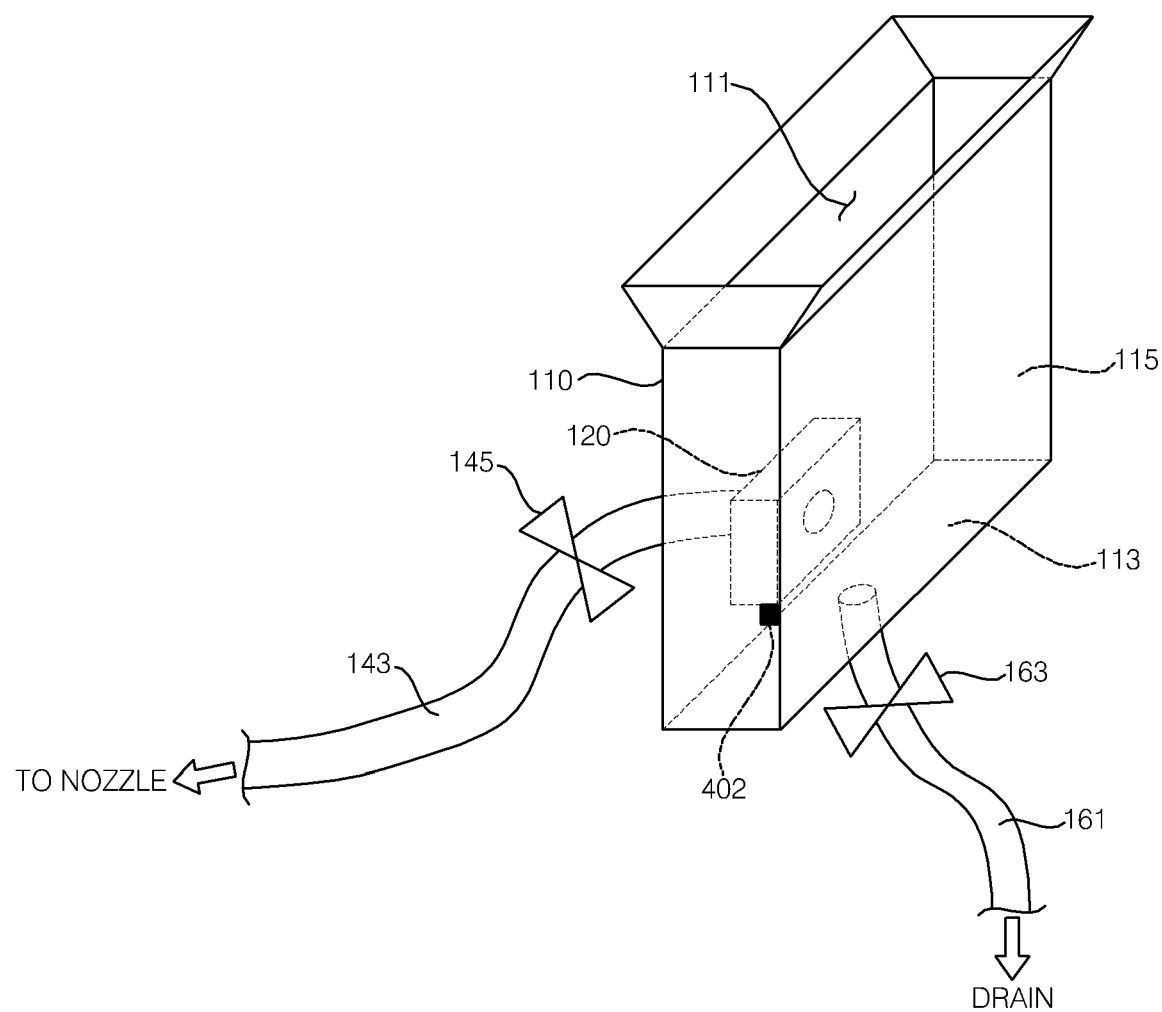
FIG. 4A is a perspective view of a water tank of FIG. 2.
Figure 4B:
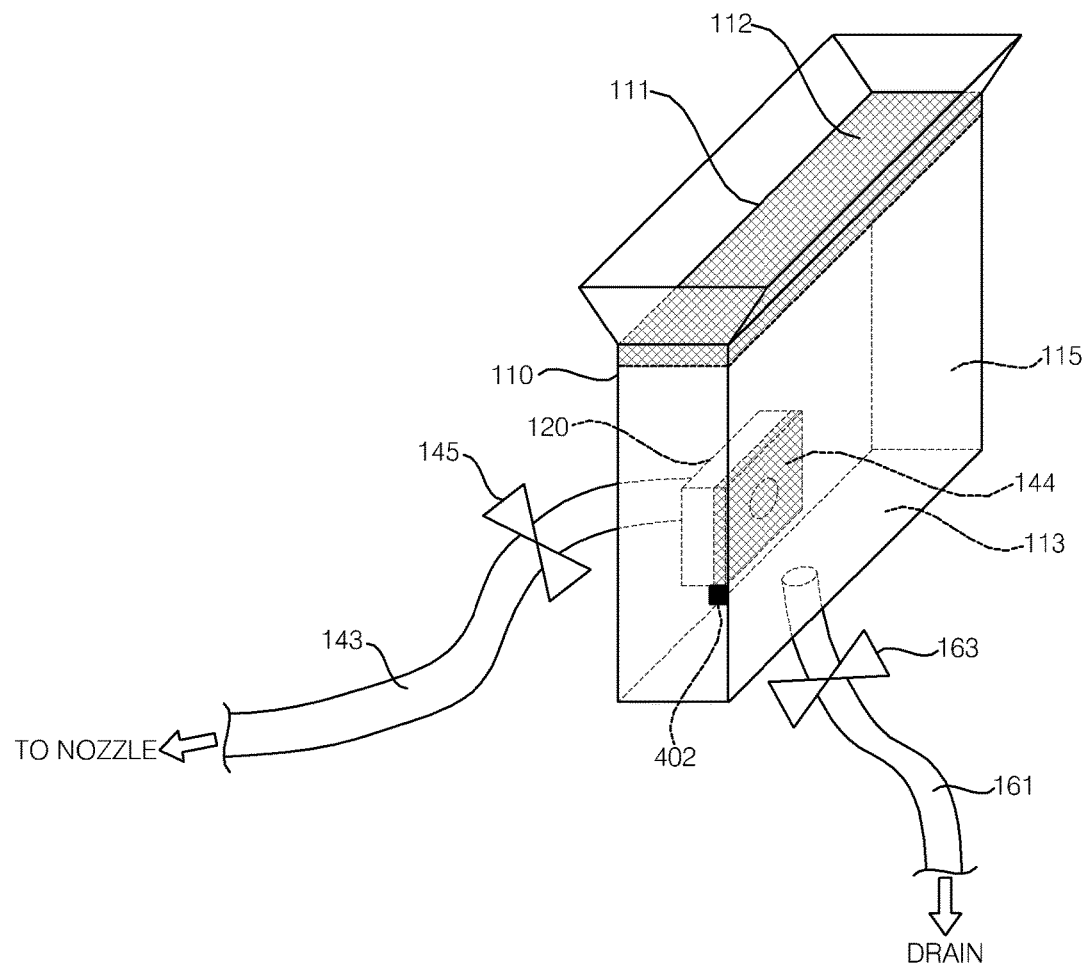
FIG. 4B is a perspective view of the water tank of FIG. 4A, to which a filter is added.

Referring to FIG. 4, an arrangement of a filter will be described below.

The water tank 110 may include a filter. The filter may be disposed at an inlet, through which water flows into the water tank 110, or may be disposed at an injection hole, through which the water is discharged to the nozzle.

An opening filter 112 may be provided for an opening 110 formed at an upper end of the water tank 110. The opening filter 112 is disposed at the inlet, through which water flows into the water tank 110, and is a device for preventing foreign substances contained in the water from flowing into the water tank 110.

An injection pipe 143, through which water is discharged to the nozzle 141, may be connected to the water tank 110 at a position above a lower surface 113, and an injection pipe filter 144 for preventing the inflow of foreign matter may be disposed at an entrance of the injection pipe 143. The injection pipe filter 144 is disposed at a discharge port, i.e., the injection pipe 143, through which water is discharged. The injection pipe filter 144 is a device for preventing foreign substances contained in the water from flowing into the nozzle 141.

There are at least three devices for removing foreign substances. The opening filter 112 prevents foreign substances from flowing into the water tank 110. A drain pipe, which will be described later, is disposed on the lower surface 113 of the water tank 110 and removes precipitated foreign substances. The injection pipe filter 144 prevents foreign substances from flowing into the nozzle 141. According to the present disclosure, the 3-way method of removing foreign substances has an effect of reducing damage to the blades and other components may be reduced.

The nozzle 141 is a device for spraying water stored in the water tank 110 on the blades 31. The water stored in the water tank 110 may flow through the injection pipe 143 to the nozzle 141.

The injection pipe 143 connects the water tank 110 and the nozzle 141 to allow the water to flow therethrough. One side of the injection pipe 143 is connected to the water tank 110. The injection pipe 143 may be connected to a side surface 115 of the water tank 110. The injection pipe filter 144 may be disposed at a position where the injection pipe 143 and the water tank 110 is connected.

Referring to FIG. 4, the injection pipe 143 may be connected to the water tank 110 at a position above the lower surface 113 of the water tank 110. When foreign substances are introduced into the water tank 110, the foreign substances may be precipitated on the lower surface 113 of the water tank 110, but the injection pipe 143 is connected at a position above the lower surface 113 of the water tank 110, thereby preventing the precipitated foreign substances from flowing into the nozzle 141 through the injection pipe 143.

A nozzle valve 145 may be disposed at the injection pipe 143. The nozzle valve 145 opens and closes the injection pipe 143. The nozzle valve 145 may be a solenoid valve or an EEV valve. The nozzle valve 145 may be controlled by the controller 300. The nozzle valve 145 controls the flow of water to the nozzle 141.

The nozzle 141 is connected to one side of the injection pipe 143 and sprays water on the blades 31. The nozzle 141 may vertically overlap the blades 31. The nozzle 141 may be disposed below the water tank 110.

The nozzle 141 may spray water downward from above the blades 31. The nozzle 141 may vertically spray the water downward from above the blades 31.

The nozzle 141 may spray water obliquely. As the nozzle 141 sprays water obliquely, water may be prevented from splashing into the body 10.

The nozzle 141 may spray water outwardly, which is a direction opposite to a rotation axis A1 of the blades 31. A spray angle $\theta 1$ of the nozzle 141 is defined as an angle between the rotation axis A1 of the blades 31 and a spray direction of the nozzle 141, and the spray angle $\theta 1$ of the nozzle 141 may form an acute angle. In this embodiment, as the nozzle 141 sprays water outwardly from the blades 31, drops of water and foreign matter, splashing from the blades 31, are not directed toward the rotation axis A1, thereby preventing the inside of the body 10 from being contaminated.

The controller 300 may rotate the blades 31 during cleaning, and more specifically, the controller 300 may rotate the blades 31 while the nozzle 141 sprays water, thereby producing an effect of removing foreign matter rapidly. According to this embodiment, the nozzle 141 sprays water in an opposite direction to the rotation axis A1 of the blades 31, thereby pushing the foreign matter outwardly; and centrifugal force is added to the foreign matter by the rotation of the blades 31, such that the foreign matter may be rapidly separated outwardly from the blades 31.

The lawn mower robot 1 may further include a blower fan 151 disposed in the body 10 and generating an air flow toward the blades 31.

The blower fan 151 primarily removes moisture from the blades 31 to dry the blades 31, and secondarily removes foreign substances from the blades 31. The blower fan 151 may vertically overlap the blades 31.

Referring to FIG. 2, the blower fan 151 may be disposed in an opposite direction to the nozzle 141 with respect to the rotation axis A1. Although not illustrated herein, the blower fan 151 may be disposed in the same direction as the nozzle 141 with respect to the rotation axis A1.

The blower fan 151 may blow air downward from above the blades 31. The blower fan 151 may vertically blow air downward from above the blades 31. The blower fan 151 may generate an air flow downward from above the blades 31.

The blower fan 151 may blow air obliquely. As the blower fan 151 blows air obliquely, water or foreign matter may be prevented from splashing into the body 10.

The blower fan 151 may blow air outwardly, which is a direction opposite to a rotation axis A1 of the blades 31. An air blow angle θ2 of the blower fan 151 is defined as an angle between the rotation axis A1 of the blades 31 and an air blow direction of the blower fan 151, and the air blow angle θ2 of the blower fan 151 may form an acute angle. According to the embodiment, as the blower fan 151 blows air outwardly from the blades 31, drops of water and foreign matter, splashing from the blades 31, are not directed toward the rotation axis A1, thereby preventing the inside of the body 10 from being contaminated.

The controller 300 may rotate the blades 31 during drying, and more specifically, the controller 300 may rotate the blades 31 while the blower fan 151 is in operation, thereby producing an effect of rapidly removing and drying drops of water and foreign matter. According to the embodiment, the blower fan 151 blows air in an opposite direction to the rotation axis A1 of the blades 31, thereby pushing the drops of water and foreign matter outwardly, and centrifugal force is added to the drops of water and foreign matter by the rotation of the blades 31, such that the drops of water and foreign matter may be rapidly separated outwardly from the blades 31.

Figure 5:
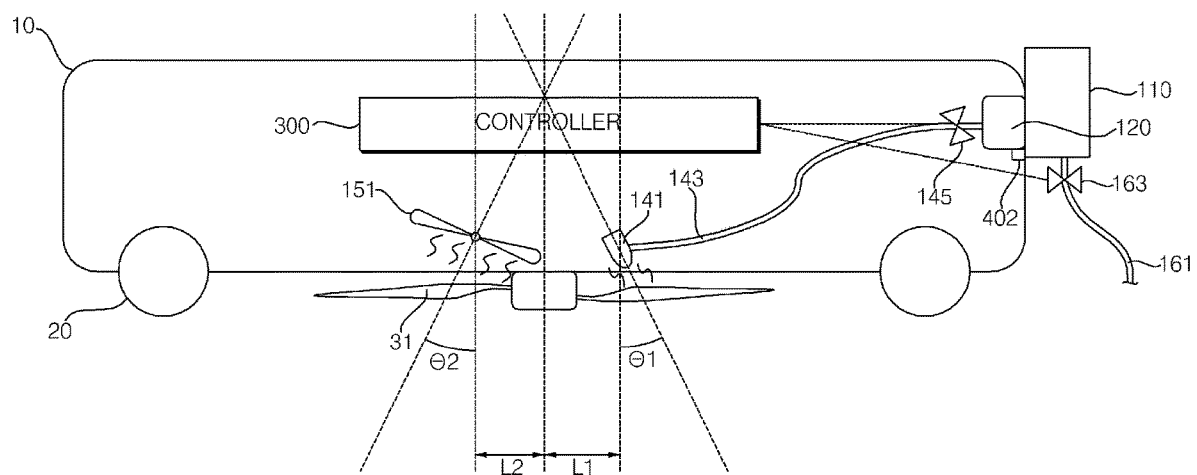
FIG. 5 is a side view of a lawn mower robot according to an embodiment of the present disclosure.

Referring to FIG. 5, the blower fan 151 may be disposed closer to the rotation axis A1 of the blades 31 than the nozzle 141. A distance L2 between the blower fan 151 and the rotation axis A1 of the blades 31 may not be longer than a distance L1 between the nozzle 141 and the rotation axis A1 of the blades 31. If the nozzle 141 is disposed closer to the rotation axis A1 of the blades 31 than the blower fan 151, a problem occurs in that it is difficult for the blower fan 151 to separate the drops of water radially (outwardly) from the blades 31. Accordingly, by having the blower fan 151 disposed more inward than the nozzle 141, drops of water may be separated easily in a radial direction. As the air blow angle θ2 of the blower fan 151 faces in an opposite direction to the rotation axis A1 of the blades 31, the blower fan 151, disposed more inward than the nozzle 141, blows air in the opposite direction to the rotation axis A1, thereby easily removing drops of water.

The cleaning module 100 may further include a drain pipe 161 having one side connected to the water tank 110 and discharging water stored in the water tank 110 to the outside. The drain pipe 161 is a device for discharging residual water, remaining in the water tank 110 after the cleaning operation is finished, to the outside.

The drain pipe 161 may be connected to the lower surface of the water tank 110. The drain pipe 161 is provided with a drain valve 163 to control drainage. The drain valve 163 may be connected to the controller 300. The drain valve 163 may be a solenoid valve or an EEV valve.

The water tank 110 may include a water level sensor 402. The water level sensor 402 may be a weight sensor. The water level sensor 402 may detect the weight and water level of water stored in the water tank 110. The water level sensor 402 is connected to the controller 300 to transmit a detection signal to the controller 300. The water level sensor 402 may be mechanically or electrically connected to the drain valve 163, and if the water level of water stored in the water tank 110 is greater than or equal to a reference level, the water level sensor 402 may directly open the drain valve 163 to drain some water.

Figure 6:
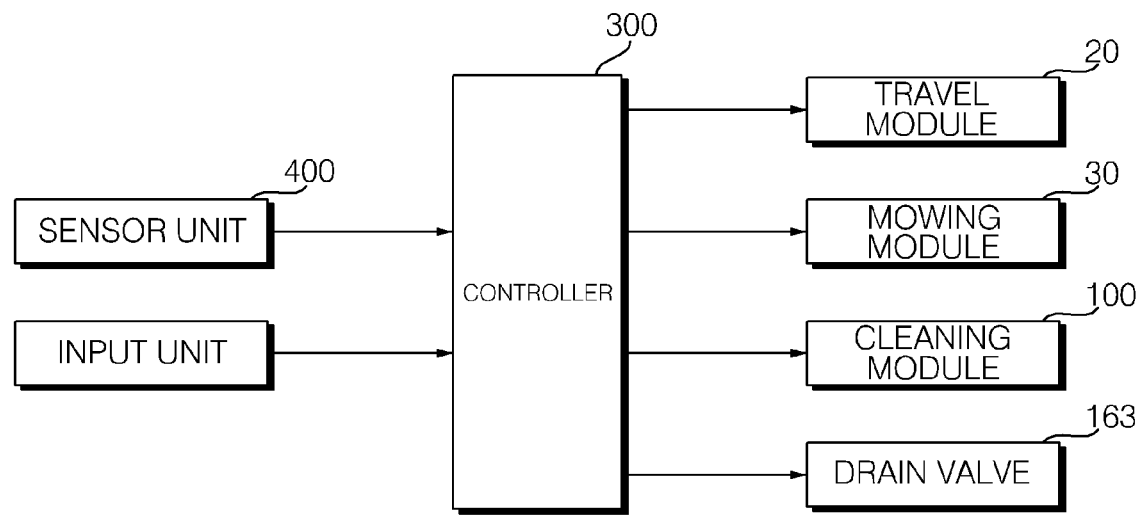
FIG. 6 is a block diagram illustrating main components of a lawn mower robot according to an embodiment of the present disclosure.
Figure 7:
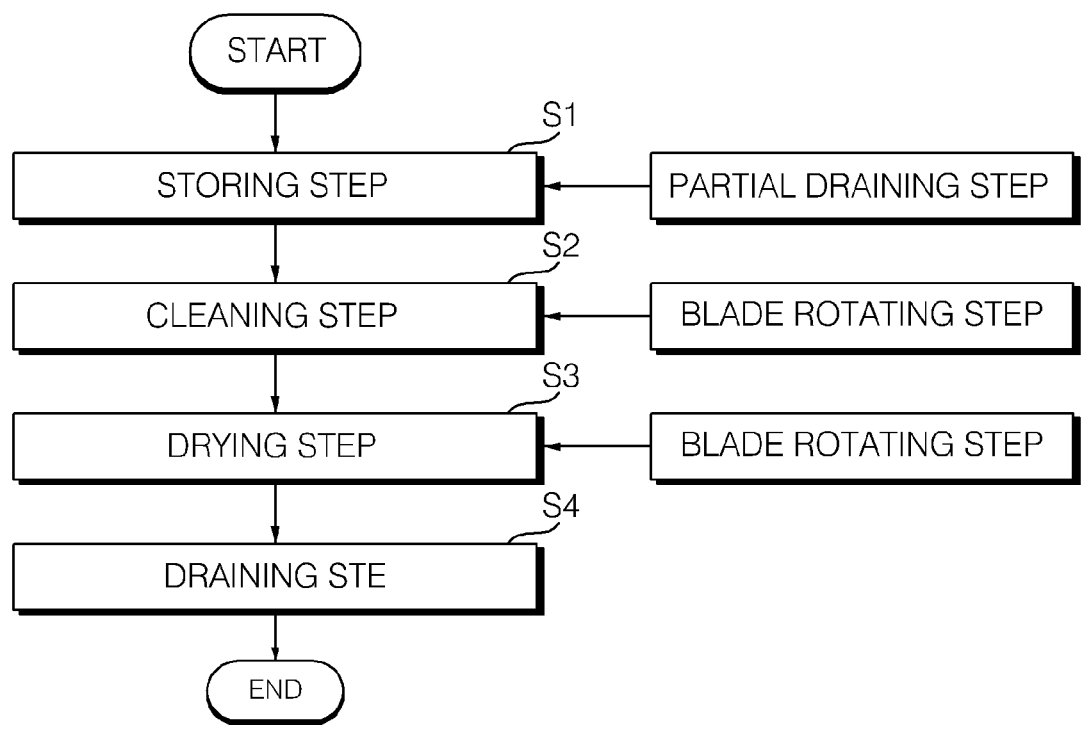
FIG. 7 is a block diagram illustrating a method of controlling a lawn mower robot according to an embodiment of the present disclosure.

Referring to FIGS. 6 and 7, a method of controlling a lawn mower robot will be described below.

FIG. 6 is a block diagram illustrating a control relationship of the lawn mower robot 1 of FIG. 2.

The controller 300 may control the lawn mower robot 1 by receiving a signal from the sensing unit 400. Once a user inputs a command through the input unit, the controller 300 may control the lawn mower robot 1 according to the command.

The controller 300 may control the travel module 20 to move the lawn mower robot 1. The controller 300 may control the work module 30 to mow the grass. The controller 300 may control the cleaning module 100 to clean the blades 31. The controller 300 may control the drain valve 163 to drain water stored in the water tank 110.

The method of controlling the lawn mower robot 1 includes: a storing step (S1) of partially opening the water tank 110 to store water; after a mowing operation is finished, a cleaning step (S2) of cleaning the blades 31 by spraying water stored in the water tank 110; a drying step (S3) of drying the blades 31 with the blower fan 151 disposed in the body 151; and after the cleaning step is finished, a draining step (S4) of draining remaining water by opening the drain valve 163 of the drain pipe 161 disposed at the lower surface 113 of the water tank 110.

In the storing step (S1), the water collecting part 131 collects outside water, such as falling rainwater and the like, and stores the collected water in the water tank 110. The controller 300 may control a rain sensor to sense rain during rainfall, and to open the cap disposed at the top of the water tank 110 to collect rainwater.

The method of controlling the lawn mower robot 1 may further include a partial draining step (S12), in which upon detecting that a water level is greater than or equal to a reference level, the water level sensor 402 of the water tank 110 may transmit a signal to the controller 300, and the controller 300 may lower the water level in S12 by opening the drain valve 163 of the drain pipe 161 disposed at the lower surface 113 of the water tank 110, to drain some water.

In the partial draining step (S12), once a predefined period of time elapses after water is stored in the water tank 110, the controller 300 may partially open the drain valve 163 of the drain pipe 161 to drain some water, and may remove precipitated foreign substances in S12.

In the cleaning step (S2), water stored in the water tank 110 may flow through the injection pipe 143 into the nozzle 141 to be sprayed on the blades 31. The controller 300 may open the nozzle valve 145, disposed at the injection pipe 143, to spray water.

In the cleaning step (S2), the controller 300 may rotate the blades 31 and may generate centrifugal force to clean the foreign substances more easily.

In the drying step (S3), the controller 300 may operate the blower fan 151 to generate an air flow, so as to dry the blades 31 by removing drops of water remaining on the blades 31 and to remove foreign substances remaining on the blades 31.

In the drying step (S3), the controller 300 may rotate the blades 31 and may generate centrifugal force to remove the drops of water and foreign substances more rapidly and to dry the blades 31 more easily.

In the draining step (S4), the controller 300 may operate the drain valve 163 to drain water remaining in the water tank 110, thereby maintaining the water tank 110 in a clean condition.

The lawn mower robot and the method of controlling the same according to the embodiments of the present disclosure have one or more of the following effects.

Firstly, the lawn mower robot includes the cleaning module for spraying water on the blades, such that the blades may be cleaned easily without requiring to lift the lawn mower robot.

Secondly, the cleaning module has a water tank, in which external water, such as rainwater and the like, is collected and stored, such that the rainwater may be reused for cleaning without separate supply of water.

However, the effects of the present disclosure are not limited to the aforesaid, and other effects not described herein will be clearly understood by those skilled in the art from the following description of the appended claims.

Although the exemplary embodiments have been illustrated and described, embodiments are not limited to the above-described particular embodiments, various modifications are possible by those skilled in the art without departing from the scope and spirit as disclosed in the accompanying claims and these modifications should not be understood separately from the scope and spirit.

What is claimed is:

1. A lawn mower robot comprising:
   a body;
   a travel module configured to move the body;
   a work module having at least one or more blades and a drive motor configured to drive the one or more blades;
   a cleaning module configured to clean the one or more blades, wherein the cleaning module includes:
      a water tank configured to store water; and
      a nozzle configured to spray water stored in the water tank on the one or more blades; and
   a blower fan disposed on the body, the blower fan being configured to generate an air flow toward the one or more blades.

2. The lawn mower robot of claim 1, wherein the cleaning module further includes a water collecting part connected to an upper side of the water tank and having an open upper portion.

3. The lawn mower robot of claim 1, wherein the cleaning module further includes:
   a water collecting part disposed on an upper side of the body and having an open upper portion, wherein the open upper portion is configured to direct water into the water collecting part; and
   a water collecting pipe configured to direct water, collected in the water collecting part, into the water tank.

4. The lawn mower robot of claim 1, wherein the cleaning module is disposed above the work module.

5. The lawn mower robot of claim 1, wherein the cleaning module further includes a pump configured to pressurize the water in the water tank and transfer the water to the nozzle.

6. The lawn mower robot of claim 1, wherein the water tank has (a) an opening formed at an upper end thereof, and (b) a filter at the opening, wherein the filter is configured to prevent inflow of foreign matter.

7. The lawn mower robot of claim 1, wherein the water tank comprises an injection pipe connected at a position above a lower surface of the water tank, the injection pipe being configured to supply water to the nozzle.

8. The lawn mower robot of claim 1, wherein the nozzle vertically overlaps the one or more blades.

9. The lawn mower robot of claim 8, wherein the nozzle sprays water outwardly from a rotation axis of the one or more blades.

10. The lawn mower robot of claim 1, wherein the blower fan is configured to generate the air flow outwardly from a rotation axis of the one or more blades.

11. The lawn mower robot of claim 1, wherein the blower fan is disposed closer to a rotation axis of the one or more blades than the nozzle.

12. The lawn mower robot of claim 1, further including a drain pipe connected to the water tank, the drain pipe being configured to discharge water stored in the water tank outside of the water tank.

13. The lawn mower robot of claim 12, wherein the drain pipe is connected to a lower surface of the water tank, and is provided with a drain valve for opening and closing a flow path of the drain pipe.

14. The lawn mower robot of claim 13, further including a water level sensor disposed in the water tank,
   wherein the water level sensor is mechanically or electrically connected to the drain valve.

15. A lawn mower robot comprising:
   a body;
   a blade rotatably mounted to the body and a drive motor configured to drive the blade;
   a cleaning module configured to clean the blade, wherein the cleaning module includes:
      a water tank configured to store water; and
      a nozzle configured to spray water stored in the water tank on the blade and
   a blower fan disposed on the body, the blower fan being configured to generate an air flow toward the blade.

16. A method of controlling a lawn mower robot including a body defining an inner space, a blade configured to cut grass, and a water tank configured to store water, the method comprising:
   storing water in the water tank;
   mowing grass using the lawn mower robot;
   after the mowing, cleaning the blade by spraying the water stored in the water tank on the blade; and
   drying the blade using a blower fan disposed on the body.

17. The method of claim 16, wherein cleaning the blade further includes rotating the blade.

18. The method of claim 16, further comprising, after cleaning the blade, draining water from the water tank by opening a drain valve coupled to the water tank.

\* \* \* \* \*